United States Patent
Gill

(10) Patent No.: US 7,342,753 B2
(45) Date of Patent: Mar. 11, 2008

(54) IN-STACK BIASING OF THE FREE LAYER OF A MAGNETORESISTIVE READ ELEMENT

(75) Inventor: Hardayal Singh Gill, Palo Alto, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 409 days.

(21) Appl. No.: 11/039,312

(22) Filed: Jan. 20, 2005

(65) Prior Publication Data
US 2006/0158792 A1    Jul. 20, 2006

(51) Int. Cl.
G11B 5/39 (2006.01)
(52) U.S. Cl. .................................. 360/324.12
(58) Field of Classification Search ............ 360/324.12
See application file for complete search history.

(56) References Cited

U.S. PATENT DOCUMENTS

| | | | |
|---|---|---|---|
| 6,473,279 B2 | 10/2002 | Smith et al. | |
| 6,704,175 B2* | 3/2004 | Li et al. ................. | 360/324.11 |
| 6,741,432 B2 | 5/2004 | Pinarbasi | |
| 6,958,892 B2* | 10/2005 | Gill ........................ | 360/324.12 |
| 6,988,308 B2* | 1/2006 | Bergevin et al. ......... | 29/603.03 |
| 7,072,154 B2* | 7/2006 | Gill et al. .............. | 360/324.12 |
| 7,106,561 B2* | 9/2006 | Carey et al. ............ | 360/324.12 |
| 7,161,771 B2* | 1/2007 | Lin et al. ................ | 360/314 |
| 7,180,716 B2* | 2/2007 | Li et al. ................. | 360/324.12 |
| 7,280,325 B1* | 10/2007 | Pan ........................ | 360/324.12 |
| 2003/0179513 A1 | 9/2003 | Pinarbasi | |
| 2003/0235016 A1* | 12/2003 | Gill ........................ | 360/324.12 |
| 2004/0086751 A1 | 5/2004 | Hasegawa et al. | |
| 2004/0109264 A1 | 6/2004 | Gill | |
| 2005/0219773 A1* | 10/2005 | Li et al. ................. | 360/324.12 |
| 2005/0264950 A1* | 12/2005 | Gill ........................ | 360/324.11 |
| 2005/0280957 A1* | 12/2005 | Gill ........................ | 360/324.12 |
| 2006/0044706 A1* | 3/2006 | Gill ........................ | 360/324.12 |
| 2006/0044708 A1* | 3/2006 | Gill ........................ | 360/324.12 |
| 2006/0067016 A1* | 3/2006 | Childress et al. ....... | 360/324.12 |
| 2007/0064350 A1* | 3/2007 | Gill ........................ | 360/324.2 |

\* cited by examiner

Primary Examiner—Jefferson Evans
(74) Attorney, Agent, or Firm—Duft Bornsen & Fishman, LLP

(57) ABSTRACT

A magnetoresistive read element with improved biasing of the free layer is disclosed. The read element includes a free layer, a spacer layer, a first pinned bias layer, an APC layer, and a second pinned bias layer antiparallel exchange coupled with the first pinned bias layer. The second pinned bias layer has a width greater than the width of the first pinned bias layer, while the volumes of the first and second pinned bias layers are substantially similar. The width of the first pinned bias layer allows magnetic fields from the first pinned bias layer to longitudinally bias the free layer. The width of the second pinned bias layer avoids magnetic fields of the second pinned bias layer from biasing the free layer.

21 Claims, 3 Drawing Sheets

IN-STACK BIASING OF THE FREE LAYER OF A MAGNETORESISTIVE READ ELEMENT

BACKGROUND OF THE INVENTION

1. Field of the Invention

The invention is related to the field of magnetic disk drive systems, and in particular, to providing improved in-stack biasing of the free layer of a magnetoresistive (MR) read element.

2. Statement of the Problem

Many computer systems use magnetic disk drives for mass storage of information. Magnetic disk drives typically include one or more recording heads (sometimes referred to as sliders) that include read elements and write elements. A suspension arm holds the recording head above a magnetic disk. When the magnetic disk rotates, air generated by the rotation of the magnetic disk causes an air bearing surface (ABS) side of the recording head to ride a particular height above the magnetic disk. The height depends on the shape of the ABS. As the recording head rides on the air bearing, an actuator moves an actuator arm that is connected to the suspension arm to position the read element and the write element over selected tracks of the magnetic disk.

To read data from the magnetic disk, transitions on a track of the magnetic disk create magnetic fields. As the read element passes over the transitions, the magnetic fields of the transitions modulate the resistance of the read element. The change in resistance of the read element is detected by passing a sense current through the read element and then measuring the change in voltage across the read element. The resulting signal is used to recover the data encoded on the track of the magnetic disk.

The most common type of read elements are magnetoresistive (MR) read elements. One type of MR read element is a Giant MR (GMR) read element. GMR read elements using only two layers of ferromagnetic material (e.g., NiFe) separated by a layer of nonmagnetic material (e.g., Cu) are generally referred to as spin valve (SV) elements. A simple-pinned SV read element generally includes an antiferromagnetic (AFM) layer, a first ferromagnetic layer, a spacer layer, and a second ferromagnetic layer. The first ferromagnetic layer (referred to as the pinned layer) has its magnetization typically fixed (pinned) by exchange coupling with the AFM layer (referred to as the pinning layer). The pinning layer generally fixes the magnetic moment of the pinned layer perpendicular to the ABS of the recording head. The magnetization of the second ferromagnetic layer, referred to as a free layer, is not fixed and is free to rotate in response to the magnetic field from the magnetic disk. The magnetic moment of the free layer is free to rotate upwardly and downwardly with respect to the ABS in response to positive and negative magnetic fields from the rotating magnetic disk. The free layer is separated from the pinned layer by the spacer layer, which is nonmagnetic and electrically conducting.

Another type of spin valve read element is an antiparallel pinned (AP) spin valve read element. The AP-pinned spin valve read element differs from the simple pinned spin valve read element in that an AP-pinned structure has multiple thin film layers forming the pinned layer instead of a single pinned layer. The AP-pinned structure has an antiparallel coupling (APC) layer between first and second ferromagnetic pinned layers. The first pinned layer has a magnetization oriented in a first direction perpendicular to the ABS by exchange coupling with the AFM pinning layer. The second pinned layer is antiparallel exchange coupled with the first pinned layer because of the selected thickness of the APC layer between the first and second pinned layers. Accordingly, the magnetization of the second pinned layer is oriented in a second direction that is antiparallel to the direction of the magnetization of the first pinned layer.

Another type of MR read element is a Magnetic Tunnel Junction (MTJ) read element. The MTJ read element comprises first and second ferromagnetic layers separated by a thin, electrically insulating, tunnel barrier layer. The tunnel barrier layer is sufficiently thin that quantum-mechanical tunneling of charge carriers occurs between the ferromagnetic layers. The tunneling process is electron spin dependent, which means that the tunneling current across the junction depends on the spin-dependent electronic properties of the ferromagnetic materials and is a function of the relative orientation of the magnetic moments, or magnetization directions, of the two ferromagnetic layers. In the MTJ read element, the first ferromagnetic layer has its magnetic moment pinned (referred to as the pinned layer). The second ferromagnetic layer has its magnetic moment free to rotate in response to an external magnetic field from the magnetic disk (referred to as the free layer). When a sense current is applied, the resistance of the MTJ read element is a function of the tunneling current across the insulating layer between the ferromagnetic layers. The tunneling current flows perpendicularly through the tunnel barrier layer, and depends on the relative magnetization directions of the two ferromagnetic layers. A change of direction of magnetization of the free layer causes a change in resistance of the MTJ read element, which is reflected in voltage across the MTJ read element.

GMR read elements and MTJ read elements may be current in plane (CIP) read elements or current perpendicular to the planes (CPP) read elements. Read elements have first and second leads for conducting a sense current through the read element. If the sense current is applied parallel to the major planes of the layers of the read element, then the read element is termed a CIP read element. If the sense current is applied perpendicular to the major planes of the layers of the read element, then the read element is termed a CPP read element.

One problem facing designers of read elements is stabilizing the magnetic moment of the free layer. Although the magnetic moment of the free layer is free to rotate upwardly or downwardly with respect to the ABS in response to positive and negative magnetic fields from the magnetic disk, it is important to longitudinally bias the free layer (biased parallel to the ABS and parallel to the major planes of the layers of the read element) to avoid unwanted movement or jitter of the magnetic moment of the free layer. Unwanted movement of the magnetic moment adds noise and unwanted frequencies to the signals read from the read element.

One current method used to stabilize the magnetic moment of the free layer is to bias the free layer using an in-stack biasing layer structure. The biasing layer structure includes a pinned bias layer and a pinning bias layer separated from the free layer by a spacer layer. The pinned bias layer has a magnetization pinned by exchange coupling with the pinning bias layer. The pinned bias layer is generally very thick, on the order of 40 Å or more. Because of the large size of the pinned bias layer, the pinning bias layer does not effectively fix the magnetic moment of the pinned bias layer permanently. Because the magnetic moment of the pinned bias layer is unstable, the pinned bias layer cannot effectively stabilize the magnetic moment of the free layer.

Therefore, one problem with this configuration is that the pinned bias layer provides weak biasing of the magnetic moment of the free layer.

Another current method used to stabilize the magnetic moment of the free layer is to bias the free layer using first and second hard bias magnetic layers that abut first and second sides of the read element. There are multiple problems with this configuration. First, because the hard bias magnetic layers are on either side of the read element, side shields cannot be inserted on either side of the free layer of the read element. Secondly, the hard bias magnetic layers are insulated from the free layer and the rest of the read element. The insulation and the gap between the magnetic layers and free layer reduce the magnetic field applied to the free layer from the magnetic layers. The reduced magnetic field can provide for weak biasing of the magnetic moment of the free layer. Third, the hard bias magnetic layers do not uniformly bias the free layer. The end portions of the free layer can become over-biased and do not properly respond to magnetic fields from the magnetic disk.

Therefore, a need exists for a more effective way to bias the free layer of a read element.

SUMMARY OF THE SOLUTION

The invention solves the above and other related problems with a magnetoresistive (MR) read element having improved biasing of the magnetic moment of the free layer. In one embodiment, the read element includes a free layer, a spacer layer, and a biasing layer structure. The biasing layer structure includes a first pinned bias layer, an antiparallel coupled (APC) layer, and a second pinned bias layer. The spacer layer is sandwiched between the free layer and the first pinned bias layer. The APC layer is sandwiched between the first pinned bias layer and the second pinned bias layer. The second pinned bias layer has a magnetic moment that is parallel to an air bearing surface (ABS) of a recording head. The first pinned bias layer has a magnetic moment that is antiparallel exchange coupled with the magnetic moment of the second pinned bias layer.

The first pinned bias layer has a width substantially similar to the width of the free layer. The second pinned bias layer has a width greater than the width of the first pinned bias layer and the width of the free layer. Although the width of the first pinned bias layer and the width of the second pinned bias layer are different, the volumes of the first pinned bias layer and the second pinned bias layer are substantially similar. Therefore, the thickness of the first pinned bias layer is greater than the thickness of the second pinned bias layer in order to equalize the volumes. There is very strong pinning between the first pinned bias layer and the second pinned bias layer because the volume magnetic moments of the first pinned bias layer and the second pinned bias layer are comparable and cancel each other out (or very nearly cancel each other out).

The different widths of the first pinned bias layer and the second pinned bias layer affect the magnitude of the bias field generated by bias layer structure to bias the free layer. The proximity of the first pinned bias layer to the free layer and the width of the first pinned bias layer being similar to the width of the free layer allow magnetic fields from the first pinned bias layer to bias the free layer. The first pinned bias layer longitudinally biases the magnetic moment of the free layer parallel to the ABS and parallel to the major planes of the layers of the read element. Because the width of the second pinned bias layer is larger than the width of the free layer and the width of the first pinned bias layer, magnetic fields of the second pinned bias layer do not bias the free layer. The magnetic moment of the free layer is allowed to rotate in response to magnetic fields from a magnetic disk, but the magnetic moment is stabilized to avoid unwanted movement or jitter.

The invention may include other exemplary embodiments described below.

DESCRIPTION OF THE DRAWINGS

The same reference number represents the same element on all drawings.

DETAILED DESCRIPTION OF THE INVENTION

FIGS. 1-5 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
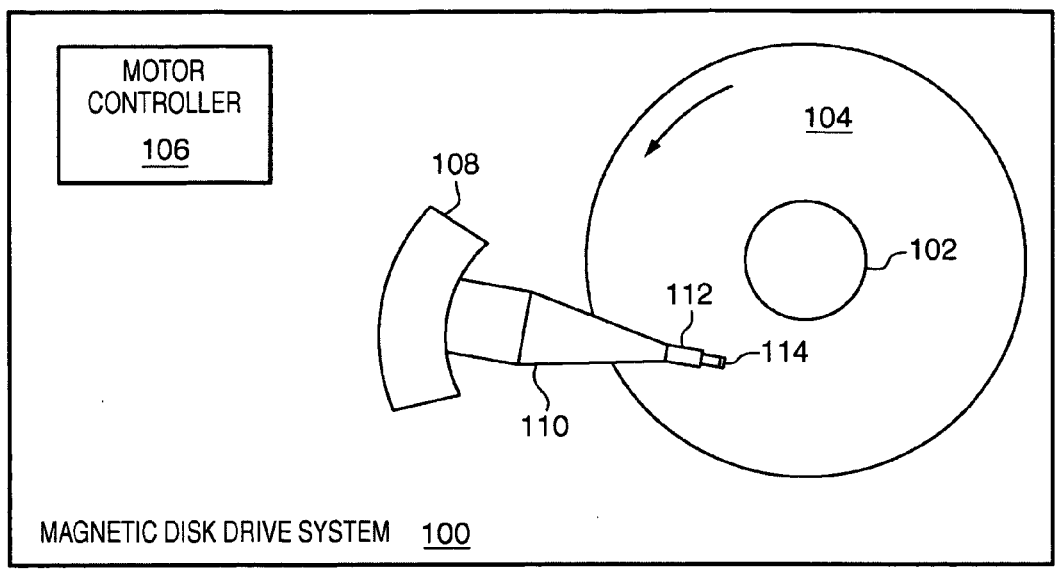
FIG. 1 illustrates a magnetic disk drive system in an exemplary embodiment of the invention.

FIG. 1 illustrates a magnetic disk drive system 100 in an exemplary embodiment of the invention. Magnetic disk drive system 100 includes a spindle 102, a magnetic disk 104, a motor controller 106, an actuator 108, an actuator arm 110, a suspension arm 112, and a recording head 114. Spindle 102 supports and rotates a magnetic disk 104 in the direction indicated by the arrow. A spindle motor (not shown) rotates spindle 102 according to control signals from motor controller 106. Recording head 114 is supported by suspension arm 112 and actuator arm 110. Actuator arm 110 is connected to actuator 108 that is configured to rotate in order to position recording head 114 over a desired track of magnetic disk 104. Magnetic disk drive system 100 may include other devices, components, or systems not shown in FIG. 1. For instance, a plurality of magnetic disks, actuators, actuator arms, suspension arms, and recording heads may be used.

When magnetic disk 104 rotates, air generated by the rotation of magnetic disk 104 causes an air bearing surface (ABS) of recording head 114 to ride on a cushion of air a particular height above magnetic disk 104. The height depends on the shape of the ABS. As recording head 114 rides on the cushion of air, actuator 108 moves actuator arm 110 to position a read element (not shown) and a write element (not shown) in recording head 114 over selected tracks of magnetic disk 104.

Figure 2:
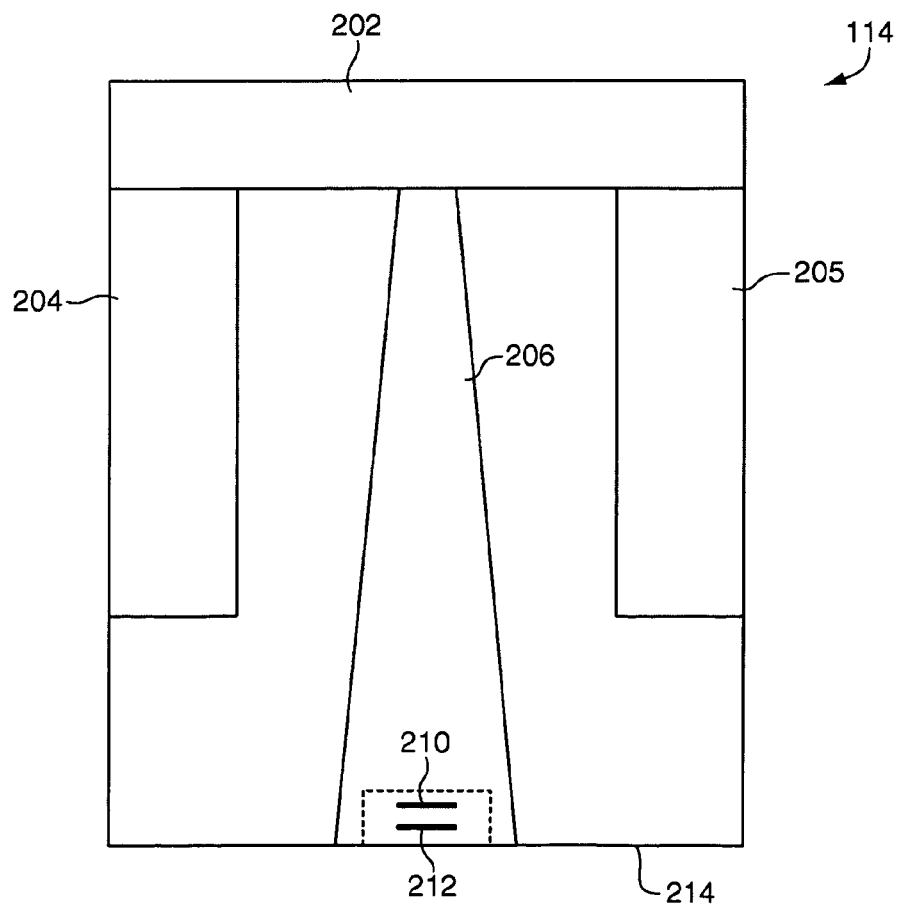
FIG. 2 illustrates a recording head in an exemplary embodiment of the invention.

FIG. 2 illustrates recording head 114 in an exemplary embodiment of the invention. The view of recording head 114 is of the ABS side of recording head 114. Recording head 114 has a cross rail 202, two side rails 204-205, and a center rail 206 on the ABS side. The rails on recording head 114 illustrate just one embodiment, and the configuration of the ABS side of recording head 114 may take on any desired form. Recording head 114 also includes a write element 210 and a read element 212 on a trailing edge 214 of recording head 114.

Figure 3:
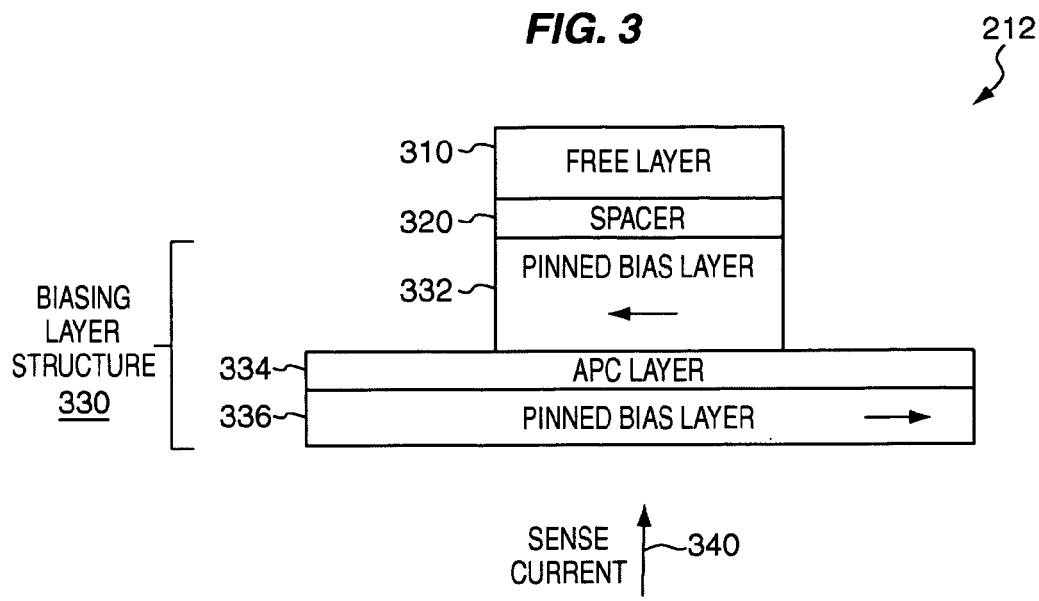
FIG. 3 illustrates a partial composition of a read element in an exemplary embodiment of the invention.

FIG. 3 illustrates a partial composition of read element 212 in an exemplary embodiment of the invention. The view of FIG. 3 is from the ABS of recording head 114. Read element 212 includes a free layer 310, a spacer layer 320, and a biasing layer structure 330. Biasing layer structure 330 includes a first pinned bias layer 332, an antiparallel coupled (APC) layer 334, and a second pinned bias layer 336. Spacer layer 320 is sandwiched between free layer 310 and the first pinned bias layer 332. The APC layer 334 is sandwiched between the first pinned bias layer 332 and the second pinned bias layer 336.

Free layer 310 is a ferromagnetic layer made from a material such as CoFe. Spacer layer 320 is a non-magnetic electrically conductive layer made from a material such as Ta. The first pinned bias layer 332 and the second pinned bias layer 336 are ferromagnetic layers. The second pinned bias layer 336 has a magnetic moment that is parallel to the ABS of recording head 114. The first pinned bias layer 332 has a magnetic moment that is antiparallel exchange coupled with the magnetic moment of the second pinned bias layer 332.

The first pinned bias layer 332 has a width substantially similar to the width of free layer 310. The second pinned bias layer 336 has a width greater than the width of the first pinned bias layer 332 and the width of free layer 310 (individually, not combined). The width of the second pinned bias layer 336 is at least twice as wide as the width of the first pinned bias layer 332 and the width of free layer 310, or in the range of two to five times as wide (FIG. 3 is not drawn to scale).

Although the width of the first pinned bias layer 332 and the width of the second pinned bias layer 336 are different, the volumes of the first pinned bias layer 332 and the second pinned bias layer 336 are substantially similar. Therefore, the thickness of the first pinned bias layer 332 is greater than the thickness of the second pinned bias layer 336 in order to equalize the volumes. For instance, the thickness of the first pinned bias layer 332 may be about 40 Å and the thickness of the second pinned bias layer 336 may be about 20 Å in one embodiment. To equalize the volumes, the width of the second pinned bias layer 336 may be twice as wide as the width of the first pinned bias layer 332. There is very strong pinning between the first pinned bias layer 332 and the second pinned bias layer 336 because the volume magnetic moments of the first pinned bias layer 332 and the second pinned bias layer 336 are comparable and cancel each other out (or very nearly cancel each other out). Thicknesses and widths of the first pinned bias layer 332 and the second pinned bias layer 336 are selected to achieve nearly identical volumes to cancel the net magnetic moment. The thickness of the first pinned bias layer 332 as compared to free layer 310 is also important. The thickness of the first pinned bias layer 332 should be 1.2 to 1.5 times as thick as free layer 310.

The different widths of the first pinned bias layer 332 and the second pinned bias layer 336 affects the magnitude of the bias field generated by bias layer structure 330 to bias free layer 310. The proximity of the first pinned bias layer 332 to free layer 310 and the width of the first pinned bias layer 332 being similar to the width of free layer 310 allows magnetic fields from the first pinned bias layer 332 to provide improved biasing of free layer 310. First pinned bias layer 332 longitudinally biases the magnetic moment of free layer 310 parallel to the ABS and parallel to the major planes of the layers of read element 212. Because the width of the second pinned bias layer 336 is larger than the width of free layer 310 and the width of the first pinned bias layer 332, the magnetic fields of the second pinned bias layer 336 do not bias free layer 310. The magnetic poles at the edges of the first pinned bias layer 332 bias free layer 310 being in close proximity to free layer 310 whereas magnetic poles at the edges of the second pinned bias layer 336 do not bias free layer 310 being at a far distance from free layer 310. Therefore, this structure generates net bias for free layer 310 while achieving stronger pinning due to comparable volume moments. The magnetic moment of free layer 310 is allowed to rotate in response to magnetic fields from magnetic disk 104 (see FIG. 1), but the magnetic moment is stabilized to avoid unwanted movement or jitter.

A sense current 340 is conducted through read element 212 from bottom to top, as shown in FIG. 3, or from top to bottom. Therefore, read element 212 is considered a current perpendicular to the planes (CPP) read element. If a magnetic field from the rotating magnetic disk 104 (see FIG. 1) rotates the magnetic moment of free layer 310 to be more antiparallel to a magnetic moment of a pinned layer (not shown), then the resistance of read element 212 increases. If a magnetic field from the rotating magnetic disk rotates the magnetic moment of free layer 310 to be more parallel to a magnetic moment of the pinned layer, then the resistance of read element 212 decreases.

Figure 4:
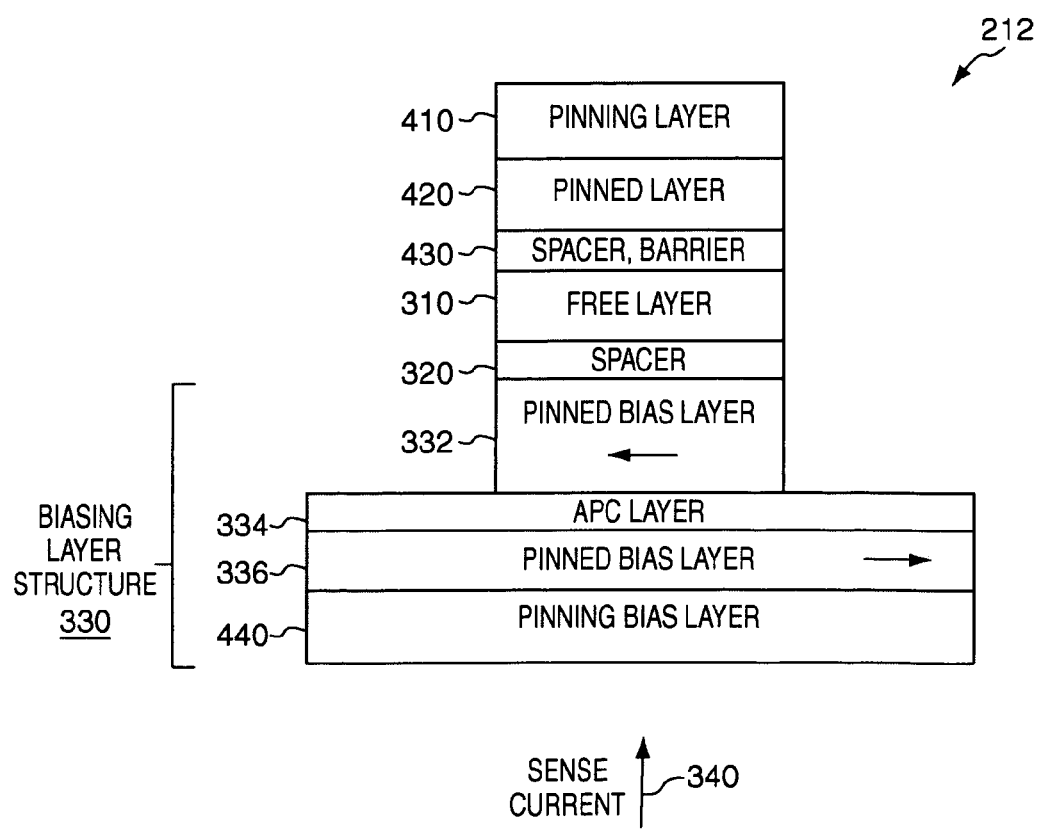
FIG. 4 illustrates another partial composition of the read element of FIG. 3 in an exemplary embodiment of the invention.

FIG. 4 illustrates another partial composition of read element 212 in an exemplary embodiment of the invention. In this embodiment, read element 212 further includes a pinning layer 410, a pinned layer 420, and a spacer/barrier layer 430. Biasing layer structure 330 further includes a pinning bias layer 440. Spacer/barrier layer 430 is sandwiched between free layer 310 and pinned layer 420. Pinning layer 410 is adjacent to pinned layer 420. Pinning bias layer 440 is adjacent to the second pinned bias layer 336.

Pinning layer 410 is an antiferromagnetic (AFM) layer made from a material such as PtMn. Pinned layer 420 may be a simple pinned layer or an antiparallel (AP) pinned layer. Spacer/barrier layer 430 may comprise a spacer layer or a barrier layer depending on whether read element 212 comprises a giant magnetoresistive (GMR) (or spin valve) read element or a magnetic tunnel junction (MTJ) read element. For a GMR read element, spacer/barrier layer 430 comprises a non-magnetic electrically conductive material such as Cu, Au, or Ag. For an MTJ read element, spacer/barrier layer 430 comprises a non-magnetic non-conductive material such as $Al_2O_3$ or MgO.

Pinning layer 410 is exchange coupled with pinned layer 420 to pin the magnetic moment of pinned layer 420 perpendicular to the ABS of read element 212. Pinning bias layer 440 is exchange coupled with the second pinned bias layer 336. The second pinned bias layer 336 is antiparallel exchange coupled with the first pinned bias layer 332 because of the selected thickness of APC layer 334 between the first and second pinned bias layers 332, 336. Accordingly, the magnetization of the first pinned bias layer 332 is oriented in a direction that is antiparallel to the direction of the magnetization of the second pinned bias layer 336.

Magnetizations of the first pinned bias layer 332 and the second pinned bias layer 336 are pinned parallel to the ABS of read element 212.

Figure 5:
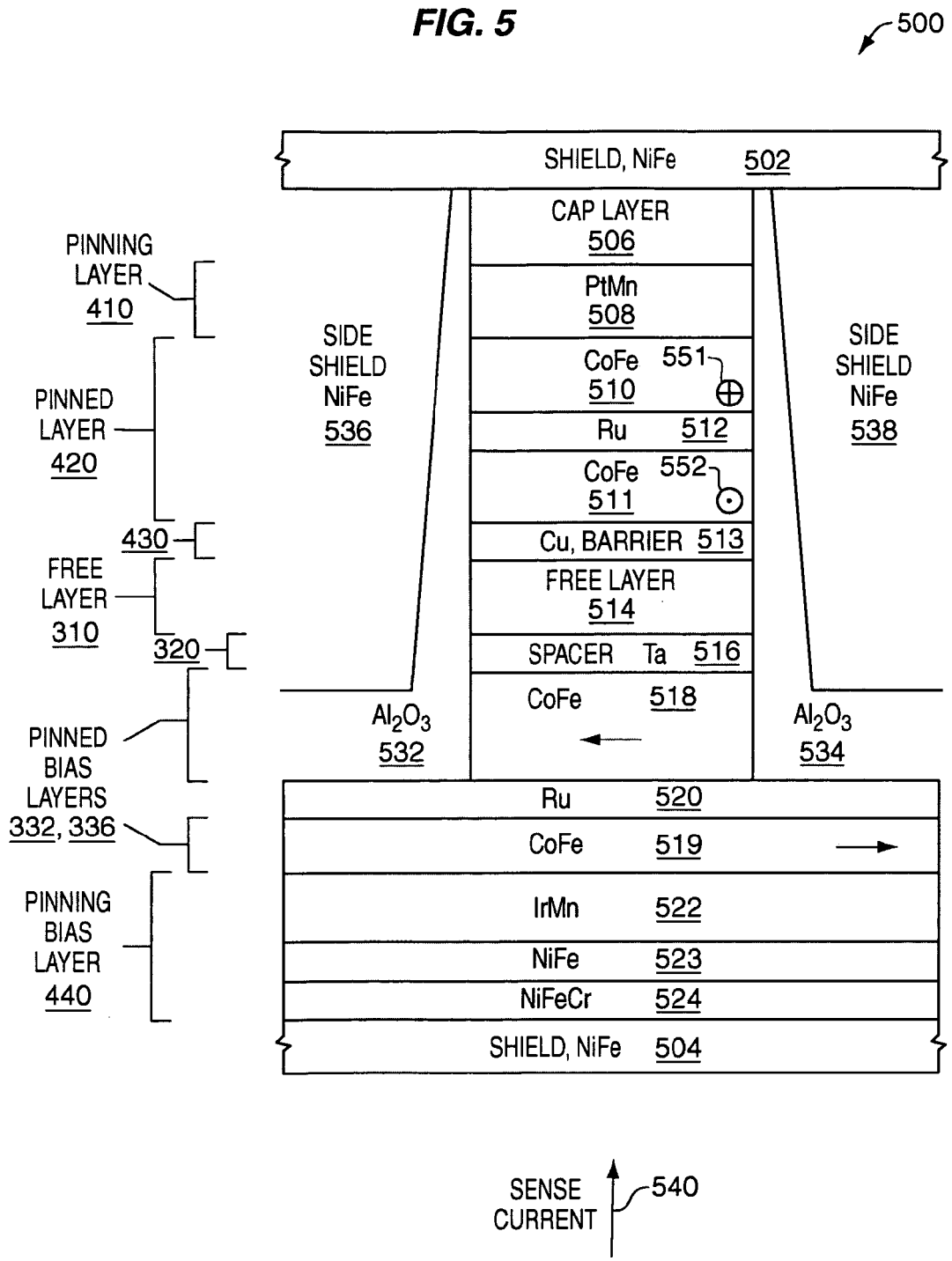
FIG. 5 illustrates another read element in an exemplary embodiment of the invention.

FIG. 5 illustrates another read element 500 in an exemplary embodiment of the invention. The view of read element 500 is from an ABS side of a recording head (not shown) that includes read element 500. Read element 500 may illustrate one embodiment of read element 212 shown in FIGS. 3-4, but read element 212 is not limited to the structure of read element 500. To correlate layers of read element 500 to read element 212 shown in FIGS. 3-4, the layers of read element 212 corresponding to the layers of read element 500 are shown on the left-hand side of FIG. 5. The layer materials described for read element 500 are just one example and other equivalent materials may be used for the layers.

Read element 500 includes shield layers 502, 504 on either end of read element 500. Shield layers 502, 504 are formed of NiFe. Cap layer 506 is adjacent to shield layer 502 to protect other layers from subsequent processing steps. Pinning layer 508 is adjacent to cap layer 506 and is formed of PtMn. A pinned layer structure is adjacent to pinning layer 508. The pinned layer structure comprises a first ferromagnetic pinned layer 510 formed of CoFe and a second ferromagnetic pinned layer 511 formed of CoFe separated by a spacer layer 512 formed of Ru. Pinning layer 508 is exchange coupled to pinned layers 510-511 to pin the magnetic moments of pinned layers 510-511 perpendicular to the ABS of the recording head. The magnetic moments of pinned layers 510-511 are illustrated as arrow tail 551 and arrow point 552, respectively.

A spacer/barrier layer 513 is adjacent to the pinned layer structure. Spacer/barrier layer 513 may comprise a spacer layer or a barrier layer depending on whether read element 500 is a GMR read element or an MTJ read element. If read element 500 comprises a GMR read element, then spacer/barrier layer 513 is formed of Cu, Au, or Ag. If read element 500 comprises an MTJ read element, then spacer/barrier layer 513 is formed of $Al_2O_3$ or MgO.

Free layer 514 is adjacent to spacer/barrier layer 513. Spacer layer 516 is sandwiched between free layer 514 and a first pinned bias layer 518. Spacer layer 516 is formed of Ta and the first pinned bias layer 518 is formed of CoFe. Spacer layer 520 (APC layer) is sandwiched between the first pinned bias layer 518 and a second pinned bias layer 519. Spacer layer 520 is formed of Ru and the second pinned bias layer 519 is formed of CoFe. A pinning bias layer structure is adjacent to the second pinned bias layer 519. The pinning bias layer structure comprises an IrMn layer 522, a NiFe layer 523, and a NiFeCr layer 524. NiFeCr layer 524 is adjacent to shield layer 504.

Insulating layers 532 and 534 formed of $Al_2O_3$ are on either side of read element 500. A first side shield layer 536 is adjacent to insulating layer 532. A second side shield layer 538 is adjacent to insulating layer 534. Side shield layers 536 and 538 are formed of NiFe.

The following lists example thicknesses and widths of the layers of read element 500. Shield layers 502, 504 are about one micron thick. Cap layer 506 is about 40 Å, pinning layer 508 is about 150 Å, pinned layer 510 is about 20 Å, spacer layer 512 is about 4 Å, and pinned layer 511 is about 20 Å. If spacer/barrier layer 513 comprises a spacer layer (such as Cu), then spacer/barrier layer 513 is about 20 Å. If spacer/barrier layer 513 comprises a tunnel barrier, then spacer/barrier layer 513 is about 5 Å. Free layer 514 is about 30 Å, spacer layer 516 is about 20 Å, and the first pinned bias layer 518 is about 40 Å. These layers all have a width of about 50 nm. Spacer layer 520 is about 4 Å, the second pinned bias layer 519 is about 20 Å, IrMn layer 522 is about 75 Å, NiFe layer 523 is about 8 Å, and NiFeCr layer 524 is about 30 Å. These layers have a width between two to five times as wide as the other layers, such as a width of 100 nm, 150 nm, 200 nm, etc. FIG. 5 is not drawn to scale.

The first pinned bias layer 518 has a width substantially similar to the width of free layer 514. The second pinned bias layer 519 is twice as wide as the width of the first pinned bias layer 518 and the width of free layer 514. To substantially equalize the volumes of the first pinned bias layer 518 and the second pinned bias layer 519, the thickness of the first pinned bias layer 518 is about 40 Å and the thickness of the second pinned bias layer 519 is about 20 Å (assuming that the depths are approximately equal).

The pinning bias layer structure, comprising IrMn layer 522, NiFe layer 523, and NiFeCr layer 524, is exchange coupled to the second pinned bias layer 519. The second pinned bias layer 519 is antiparallel exchange coupled with the first pinned bias layer 518 because of the selected thickness of APC layer 520 between the first and second pinned bias layers 518, 519. Accordingly, the magnetization of the first pinned bias layer 518 is oriented in a direction that is antiparallel to the direction of the magnetization of the second pinned bias layer 519 (as illustrated by the arrows in FIG. 5). There is very strong pinning between the first pinned bias layer 518 and the second pinned bias layer 519 because the volume magnetic moments of the first pinned bias layer 518 and the second pinned bias layer 519 are comparable and cancel each other out (or very nearly cancel each other out).

The different widths of the first pinned bias layer 518 and the second pinned bias layer 519 affect the magnitude of the bias field generated by the bias layer structure to bias free layer 514. The proximity of the first pinned bias layer 518 to free layer 514 and the width of the first pinned bias layer 518 being similar to the width of free layer 514 allows magnetic fields from the first pinned bias layer 518 to provide improved biasing of free layer 514. First pinned bias layer 518 longitudinally biases the magnetic moment of free layer 514 parallel to the ABS and parallel to the major planes of the layers of read element 500. Because the width of the second pinned bias layer 519 is twice as wide as the width of free layer 514 and the width of the first pinned bias layer 518, magnetic fields of the second pinned bias layer 519 do not bias free layer 514. The magnetic poles at the edges of the first pinned bias layer 518 bias free layer 514 being in close proximity to free layer 514 whereas magnetic poles at the edges of the second pinned bias layer 519 do not bias free layer 514 being at a far distance from free layer 514. Therefore, this structure generates net bias for free layer 514 while achieving stronger pinning due to comparable volume moments. The magnetic moment of free layer 514 is allowed to rotate in response to magnetic fields from a magnetic disk, but the magnetic moment is stabilized to avoid unwanted movement or jitter. The biasing of free layer 514 is considered in-stack biasing because the biasing layers are located within the layer stack of read element 500 (i.e., within the track width of read element 500).

Shield layers 502, 504 provide electrical connections for flow of a sense current 540 from a current source (not shown) to read element 500. Sense current 540 may be conducted through read element 500 from bottom to top, as shown in FIG. 5, or from top to bottom. Due to the direction of sense current 540 through read element 500, read element 500 is considered a current perpendicular to the planes (CPP) read element. If a magnetic field from a rotating magnetic disk rotates the magnetic moment of free layer 514 to be more antiparallel to a magnetic moment of pinned layers 510-511, then the resistance of read element 500 increases. If a magnetic field from the rotating magnetic disk rotates the magnetic moment of free layer 514 to be more parallel to a magnetic moment of pinned layers 510-511, then the resistance of read element 500 decreases.

Read element 500 may be fabricated in a magnetron sputtering or an ion beam sputtering system to sequentially deposit the multilayer structure shown in FIG. 5. Shield layer 504 formed of NiFe is deposited on a substrate (not shown). The biasing layers are then formed by sequentially depositing the NiFeCr layer 524, the NiFe layer 523, the IrMn layer 522, the second pinned bias layer 519 formed of CoFe, the APC layer 520 formed of Ru, the first pinned bias layer 534 formed of CoFe, and the spacer layer 516 formed of Ta. Other layers of read element 500 are formed by sequentially depositing the free layer 514 formed of NiFe, the spacer/barrier layer 513 formed of the appropriate material, the pinned layer 511 formed of CoFe, the APC layer 512 formed of Ru, the pinned layer 510 formed of CoFe, the pinning layer 508 formed of PtMn, and the cap layer 506.

With the above layers deposited, read sensor 500 is fabricated to generate a desired width of the first pinned bias layer 518. In one embodiment, read sensor 500 is Ion-milled down to the APC layer 520 formed of Ru to generate the desired width of the first pinned bias layer 518. However, APC layer 520 is very thin (4 Å) making it difficult to mill down to the APC layer 520 without accidentally milling into the second pinned bias layer 519. To avoid this problem in another embodiment, read sensor 500 is Ion-milled partially into the first pinned bias layer 518. The remaining portion of the first pinned bias layer 518 is oxidized to make it non-magnetic, which generates the desired width of the first pinned bias layer 518. Shield layer 502 is then deposited over cap layer 506. Insulating layers 532, 534 formed of $Al_2O_3$ are deposited between side shield layers 536, 538 formed of NiFe.

I claim:

1. A magnetoresistive (MR) read element for a recording head of a magnetic disk drive system, the read element comprising:
a free layer;
a first spacer layer adjacent to the free layer; and
a biasing layer structure for longitudinally biasing the free layer, the biasing layer structure comprising:
a first pinned bias layer adjacent to the first spacer layer and having a width substantially similar to a width of the free layer;
an antiparallel coupling (APC) layer adjacent to the first pinned bias layer; and
a second pinned bias layer adjacent to the APC layer that is antiparallel (AP) coupled to the first pinned bias layer and has a width greater than the width of the first pinned bias layer and the width of the free layer;
the first pinned bias layer has a thickness greater than the thickness of the second pinned bias layer so that the first pinned bias layer and the second pinned bias layer have substantially similar volumes.

2. The read element of claim 1 wherein magnetic fields of the first pinned bias layer bias the free layer while magnetic fields of the second pinned bias layer do not bias the free layer.

3. The read element of claim 1 wherein the width of the second pinned bias layer is in the range of two to five times as wide as the width of the first pinned bias layer and the width of the free layer.

4. The read element of claim 1 wherein the thickness of the first pinned bias layer is about 40 Å and the thickness of the second pinned bias layer is about 20 Å.

5. The read element of claim 1 wherein the read element comprises a current perpendicular to the planes (CPP) read element.

6. The read element of claim 1 wherein the biasing layer structure further comprises:
a pinning biasing layer structure adjacent to the second pinned bias layer that pins the magnetic moments of the second pinned bias layer and the first pinned bias layer parallel to an air bearing surface (ABS) of the recording head.

7. The read element of claim 6 further comprising:
a pinned layer structure;
one of a second spacer layer and a tunnel barrier layer between the pinned layer structure and the free layer; and
a pinning layer structure adjacent to the pinned layer structure that pins the pinned layer structure perpendicular to the ABS of the recording head.

8. A recording head of a magnetic disk drive system, the recording head comprising:
a read element for reading data from a magnetic disk of the magnetic disk drive system, the read element comprising:
a free layer;
a first spacer layer adjacent to the free layer; and
a biasing layer structure for longitudinally biasing the free layer, the biasing layer structure comprising:
a first pinned bias layer adjacent to the first spacer layer and having a width substantially similar to a width of the free layer;
an antiparallel coupling (APC) layer adjacent to the first pinned bias layer; and
a second pinned bias layer adjacent to the APC layer that is antiparallel (AP) coupled to the first pinned bias layer and has a width greater than the width of the first pinned bias layer and the width of the free layer;
the first pinned bias layer has a thickness greater than the thickness of the second pinned bias layer so that the first pinned bias layer and the second pinned bias layer have substantially similar volumes.

9. The recording head of claim 8 wherein magnetic fields of the first pinned bias layer bias the free layer while magnetic fields of the second pinned bias layer do not bias the free layer.

10. The recording head of claim 8 wherein the width of the second pinned bias layer is in the range of two to five times as wide as the width of the first pinned bias layer and the width of the free layer.

11. The recording head of claim 8 wherein the read element comprises a current perpendicular to the planes (CPP) read element.

12. The recording head of claim 8 wherein the biasing layer structure further comprises:
a pinning bias layer structure adjacent to the second pinned bias layer that pins the magnetic moments of the second pinned bias layer and the first pinned bias layer parallel to an air bearing surface (ABS) of the recording head.

13. The recording head of claim 12 further comprising:
a pinned layer structure;
one of a second spacer layer and a tunnel barrier layer between the pinned layer structure and the free layer; and
a pinning layer structure adjacent to the pinned layer structure that pins the pinned layer structure perpendicular to the ABS of the recording head.

14. The recording head of claim 13 further comprising:
a first shield layer adjacent to the pinning bias layer structure;
a cap layer adjacent to the pinning layer structure; and
a second shield layer adjacent to the cap layer.

15. The recording head of claim 14 further comprising:
a first side shield;
a first insulation layer between the first side shield and a first side of the read element;
a second side shield; and
a second insulation layer between the second side shield and a second side of the read element.

16. A magnetic disk drive system, comprising:
a magnetic disk; and
a recording head that includes a read element for reading data from the magnetic disk, the read element comprising:
 a free layer;
 a first spacer layer adjacent to the free layer; and
 a biasing layer structure for longitudinally biasing the free layer, the biasing layer structure comprising:
  a first pinned bias layer adjacent to the first spacer layer and having a width substantially similar to a width of the free layer;
  an antiparallel coupling (APC) layer adjacent to the first pinned bias layer; and
  a second pinned bias layer adjacent to the APC layer that is antiparallel (AP) coupled to the first pinned bias layer and has a width greater than the width of the first pinned bias layer and the width of the free layer;
  the first pinned bias layer has a thickness greater than the thickness of the second pinned bias layer so that the first pinned bias layer and the second pinned bias layer have substantially similar volumes.

17. The magnetic disk drive system of claim 16 wherein magnetic fields of the first pinned bias layer bias the free layer while magnetic fields of the second pinned bias layer do not bias the free layer.

18. The magnetic disk drive system of claim 16 wherein the width of the second pinned bias layer is in the range of two to five times as wide as the width of the first pinned bias layer and the width of the free layer.

19. The magnetic disk drive system of claim 16 wherein the read element comprises a current perpendicular to the planes (CPP) read element.

20. The magnetic disk drive system of claim 16 wherein the biasing layer structure further comprises:
a pinning bias layer structure adjacent to the second pinned bias layer that pins the magnetic moments of the second pinned bias layer and the first pinned bias layer parallel to an air bearing surface (ABS) of the recording head.

21. The magnetic disk drive system of claim 20 further comprising:
a pinned layer structure;
one of a second spacer layer and a tunnel barrier layer between the pinned layer structure and the free layer;
a pinning layer structure adjacent to the pinned layer structure that pins the pinned layer structure perpendicular to the ABS of the recording head;
a first shield layer adjacent to the pinning bias layer structure;
a cap layer adjacent to the pinning layer structure;
a second shield layer adjacent to the cap layer;
a first side shield;
a first insulation layer between the first side shield and a first side of the read element;
a second side shield; and
a second insulation layer between the second side shield and a second side of the read element.

* * * * *